United States Patent
Toth

(10) Patent No.: US 10,472,177 B2
(45) Date of Patent: Nov. 12, 2019

(54) EXTRUDED CHAIN RAIL FOR LOADING SYSTEM

(71) Applicant: Keith Manufacturing Co., Madras, OR (US)

(72) Inventor: Tim Toth, Madras, OR (US)

(73) Assignee: Keith Manufacturing Co., Madras, OR (US)

( * ) Notice: Subject to any disclaimer, the term of this patent is extended or adjusted under 35 U.S.C. 154(b) by 0 days.

(21) Appl. No.: 16/147,390

(22) Filed: Sep. 28, 2018

(65) Prior Publication Data

US 2019/0031442 A1  Jan. 31, 2019

Related U.S. Application Data

(63) Continuation of application No. 14/586,553, filed on Dec. 30, 2014, now Pat. No. 10,087,011.

(60) Provisional application No. 61/922,735, filed on Dec. 31, 2013.

(51) Int. Cl.
| | | |
|---|---|---|
| B65G 23/44 | (2006.01) | |
| B65G 37/00 | (2006.01) | |
| B65G 21/20 | (2006.01) | |
| B65G 15/62 | (2006.01) | |
| B65G 15/14 | (2006.01) | |
| B65G 15/64 | (2006.01) | |
| B65G 21/22 | (2006.01) | |

(52) U.S. Cl.
CPC ............ *B65G 23/44* (2013.01); *B65G 15/14* (2013.01); *B65G 15/62* (2013.01); *B65G 15/64* (2013.01); *B65G 21/20* (2013.01); *B65G 21/22* (2013.01); *B65G 37/005* (2013.01)

(58) Field of Classification Search
CPC ...... B65G 15/14; B65G 37/005; B65G 23/06; B65G 23/44; B65G 21/20; B65G 15/62; B65G 15/64
USPC .... 198/604, 605, 813, 816, 834, 837, 836.1, 198/841
See application file for complete search history.

(56) References Cited

U.S. PATENT DOCUMENTS

| | | | |
|---|---|---|---|
| 2,692,532 A | 6/1959 | McCallum | |
| 4,051,969 A | 10/1977 | Homanick | |
| 4,164,283 A | 8/1979 | Flajnik | |
| 4,239,102 A | 12/1980 | Boltrek | |
| 4,358,010 A | 11/1982 | Besch | |
| 4,556,143 A | 12/1985 | Johnson | |
| 5,009,168 A * | 4/1991 | Kuchta | B65G 21/22 104/111 |
| 5,137,145 A * | 8/1992 | Clopton | B65G 21/06 198/841 |
| 5,186,314 A | 2/1993 | Clopton | |
| 5,190,145 A | 3/1993 | Ledginham et al. | |
| 5,259,495 A | 11/1993 | Douglas | |

(Continued)

OTHER PUBLICATIONS

"CargoMatic The Logistic Solution," dated Feb. 2016 (In related U.S. Appl. No. 16/140,979 with accompanying transmittal letter).

*Primary Examiner* — Leslie A Nicholson, III
(74) *Attorney, Agent, or Firm* — Wells St. John P.S.

(57) ABSTRACT

The load conveyer system includes a pair of rails that carry endless chains. Each rail is an extrusion that has extruded side channel portions that allow the adjustable positioning of mounting bracket fasteners. This allows mounting brackets to be used to removably mount the rails to a preexisting floor surface without substantially modifying the floor during the rail installation or removal process.

6 Claims, 5 Drawing Sheets

(56) References Cited

U.S. PATENT DOCUMENTS

| | | | |
|---|---|---|---|
| 6,200,036 B1 | 3/2001 | Girardey | |
| 6,340,084 B1 * | 1/2002 | Burcaw | B65G 17/08 198/435 |
| 6,422,382 B1 * | 7/2002 | Ertel | B65G 21/02 198/841 |
| 6,769,534 B2 | 8/2004 | Lee | |
| 6,988,612 B1 | 1/2006 | Kabeshita et al. | |
| 7,090,070 B2 | 8/2006 | Linder | |
| 7,137,506 B2 * | 11/2006 | Munoz-Guerra | B65G 21/06 198/860.2 |
| 7,673,741 B2 * | 3/2010 | Nemedi | B65G 15/42 198/834 |
| 7,942,398 B1 | 5/2011 | Marcinik | |
| 8,944,240 B2 | 2/2015 | Frederick | |
| 2008/0298940 A1 | 12/2008 | Cleasby et al. | |

* cited by examiner

EXTRUDED CHAIN RAIL FOR LOADING SYSTEM

CROSS REFERENCE TO RELATED APPLICATION

This application is a continuation of U.S. patent application Ser. No. 14/586,553 filed Dec. 30, 2014, entitled "Chain Rail Loading System", which claims priority to U.S. provisional patent application Ser. No. 61/922,735 which was filed Dec. 31, 2013, entitled "Chain Rail Loading System", the entirety of each of which is incorporated by reference herein.

TECHNICAL FIELD

The present disclosure relates to a chain rail loading system, and more specifically, to a chain rail loading system that is adapted to be installed in a trailer or shipping container.

BACKGROUND OF THE INVENTION

Different kinds of conveyer systems have been designed or built for unloading trailers, depending on the type of load carried by the trailer. Reciprocating floor slat conveyers are one type of unloading system that is installed as part of a trailer floor for the purpose of unloading various kinds of bulk materials carried by the trailer. These systems are used to "inch" the load off the back end of the trailer and can be built into the floor of a trailer, and serve as the trailer floor. The unloading process requires a certain period of time.

Trailers are also used to haul palletized loads. While a reciprocating floor slat system can unload palletized loads, it offers a slow rate of unloading speed for the user, relatively speaking. The present disclosure provides a different type of unloading system that can be built into or onto the floor of a trailer; it offers a high rate of loading/unloading speed; and it is also constructed from light materials, so that the gross hauling weight of the trailer can be maximized.

SUMMARY OF THE INVENTION

The present disclosure is a load conveyer system. The load conveyer system includes a pair of elongated rails. Each rail is independently mountable to an underlying support or underlying support surface, typically, the framework of a trailer bed.

The rails are mountable so that they are substantially parallel to each other, for the purpose of creating a load-carrying track. Each rail has a certain height, although both rails have substantially the same height. The height of the rails creates a vertical space or envelope above the underlying support for the rails.

Each rail carries an endless chain, thus creating a pair of endless chains for conveying a load (i.e., a palletized load or the like). Each rail also has opposite ends that carry a rotatable end sprocket (where the direction of the chain is reversed). Each rail is made so that it defines an upper guideway that is adapted to enable the endless chain (carried by the rail) to move along a top side of the rail, in an exposed manner. This provides a load supporting surface for the chain to convey the load in one direction or the other. Each rail also has a lower passageway, for returning the endless chain in an opposite direction.

As discussed above, each rail is independently mountable to an underlying support or underlying support surface.

However, the design disclosed here is well-adapted for subsequent installation on a pre-existing floor surface. For example, it is common for trailers to be leased to a user. The design disclosed here can be mounted to the floor of the leased trailer, used for the term of the lease, and then easily removed prior to return of the trailer to its owner.

To accomplish this purpose, the elongated rail is made from a hollow extrusion. The extrusion includes a base or base portion that allows the extrusion to rest on the underlying support or floor surface.

The extrusion also has lateral side portions that project upwardly from the base portion, on each side. A top portion spans the distance between the lateral side portions, thus enclosing the hollow extrusion.

The top portion of the extrusion is shaped as an endless chain guideway that at least partially receives a conveyor chain, some of the chain resting within the guideway and some of the chain projecting above, so that a load can be conveyed by the chain.

A chain wear strip is received within the guideway for guiding the conveyor chain along the length of the rail. Similarly, another chain wear strip rests within the hollow extrusion on top of the base portion, just described, for guiding the conveyor chain within the extrusion (for traveling in reverse to the direction of chain travel in the top guideway).

Each lateral side portion of the extrusion includes a lengthwise channel for capturing a fastener. The typical fastener has a fastener head and a fastener shaft. The lengthwise channel includes a lengthwise slot that leads laterally into a lengthwise retaining space. The retaining space is sized for receiving the head of the fastener but allows sufficient space for the fastener head to move along the length of the rail while the fastener head is inside the retaining space. At the same time, the slot is wide enough to allow the fastener shaft to slide within and along the slot, but the slot is sufficiently narrow to prevent the fastener head from exiting laterally outwardly through the slot from the retaining space just described. This arrangement captures the fastener head within the retaining space but allows the fastener to slide or be moved to different adjustable locations along the rail to a desired location where the rail is to be fastened to the floor surface.

A mounting bracket or mounting member has a vertical portion that is arranged to contact and cover a region of the slot. The vertical portion has an opening for allowing the fastener shaft to pass through the vertical portion of the mounting member, for the purpose of connecting the fastener to the mounting member. The mounting member also has a horizontal portion for connecting the mounting member to the floor surface. In preferred form, a plurality of mounting members will be used to mount the rail to the floor surface, with the mounting members being distributed along the length of the rail. In this disclosure, the elongated rail comprises a plurality of individual rail segments that are butted together to form one rail.

The foregoing summary and other features that may be claimed for patent protection will be better understood upon review of the drawings and description that follows.

BRIEF DESCRIPTION OF THE DRAWINGS

In the drawings, like reference numerals and letters refer to like parts throughout the various views, and wherein.

DETAILED DESCRIPTION

Figure 1:
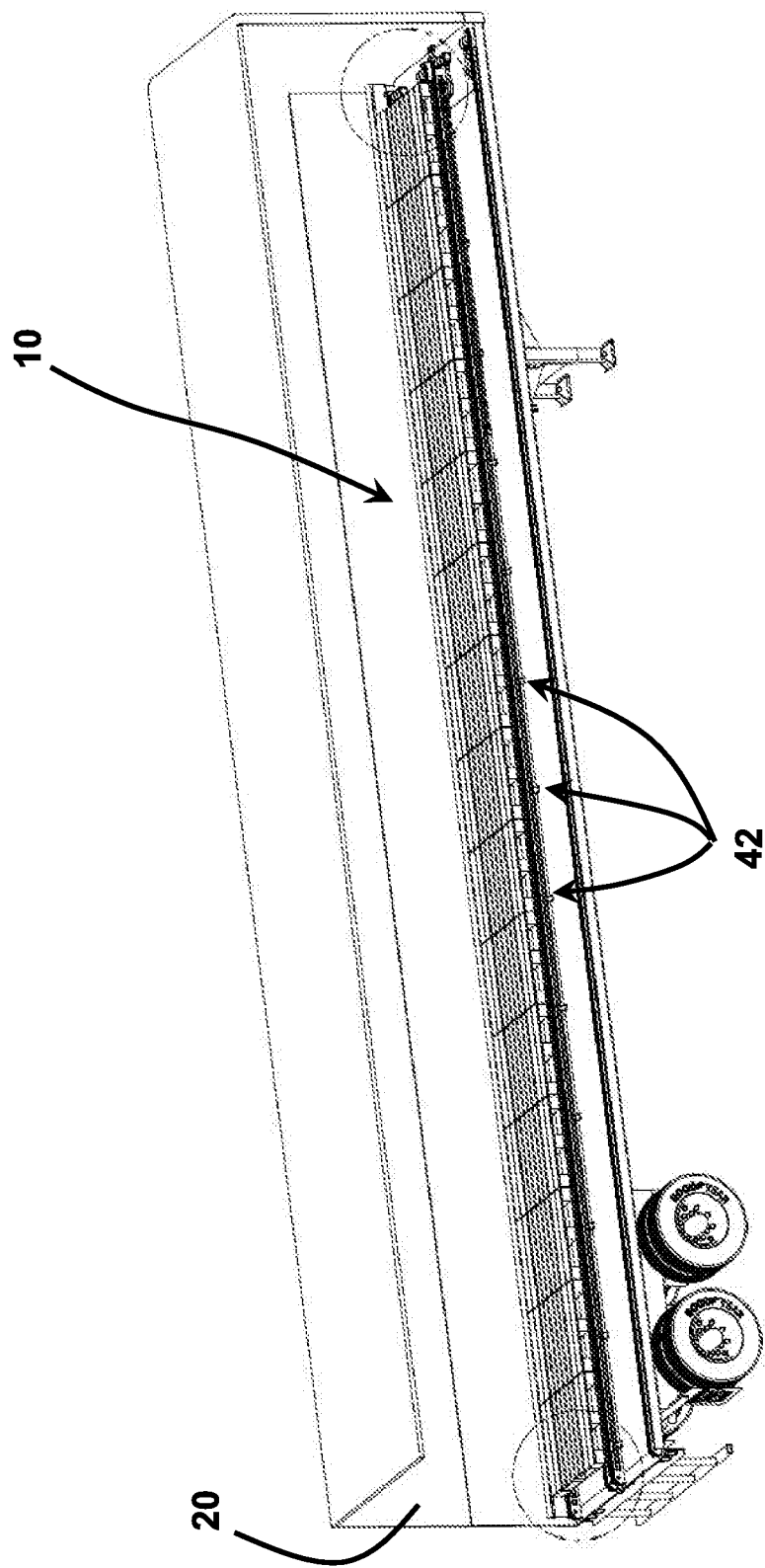
FIG. 1 is a pictorial view of a trailer with the modular chain rail loading system installed therein.

Referring now to the drawings, and first to FIG. 1, shown generally at 10 is a chain rail loading system in accordance with the present disclosure. The chain rail system 10 is a modular system, as will be further described below.

Figure 2:
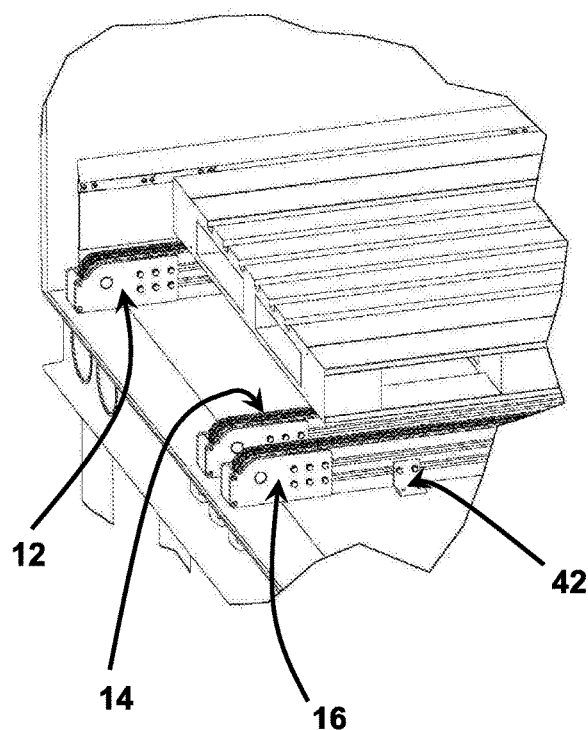
FIG. 2 is a pictorial view of the aft end (relative to the trailer) of the chain rail loading system.

Referring to FIG. 2, the chain rail system 10 includes a plurality of individual chain rails 12, 14, 16, 18. Referring back to FIG. 1, in preferred form, the system is designed to load or unload two parallel rows of pallets. Therefore, there is one chain rail 12, 18, adjacent each container sidewall (for example, one container sidewall is illustrated at 20 in FIG. 1). There are two side-by-side chain rails 14, 16 on the interior, running generally along the center line of the trailer floor. Chain rails 12, 14 operate as one pair; chain rails 16, 18 operate as a second pair.

Figure 9:
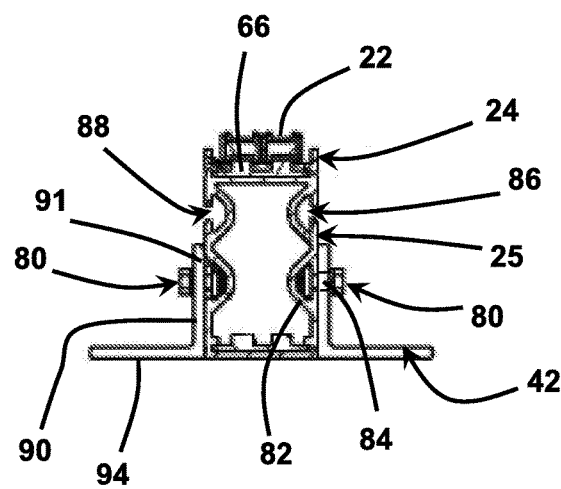
FIG. 9 is a view similar to FIG. 8, but shows placement of the chain around the chain rail and a mounting bracket for mounting the chain rail to the floor of a trailer.

Each chain rail consists of an endless chain 22 (illustrated as a double-chain) that runs along the top 24 of each chain rail (see FIG. 9). In FIG. 9, the single chain rail unit is generally indicated at 25. Sprockets 26, 28 at each end of the chain rail allow the endless chain 22 to reverse direction from the chain rail top surface 24, to run in the opposite direction (inside the lower region of the rail) during the chain's return. Referring to FIG. 9, the lower return region is generally indicated by reference numeral 30.

The sprockets are fairly conventional in that they are mounted via a spindle 32 to side brackets 34, 36. A series of bolts or similar fasteners, indicated generally at 38, connect the brackets 34, 36 and allow for a certain amount of chain tension adjustment, as desired.

Figure 7:
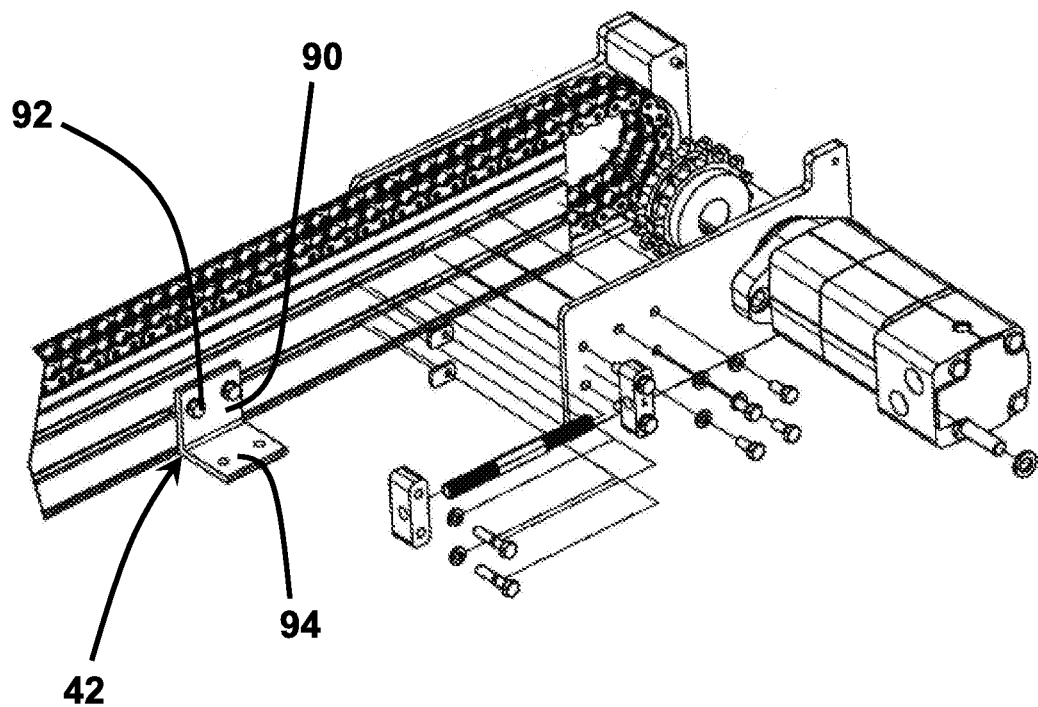
FIG. 7 is an exploded view of the forward end illustrated in FIG. 6.

On the forward end (e.g., see FIG. 7), the sprocket 28 is driven by a motor 40. Each individual chain rail will have its own motor 40. In preferred form, the motor 40 is a direct drive, hydraulic motor.

Each chain rail is mounted to the floor of the trailer via a series of brackets 42. Like the aft end of the rail, the forward end has side plates 48, 50 that may be adjusted for the purpose of addressing chain tension. A tension adjustment bolt 44 is provided for this purpose.

Figure 10:
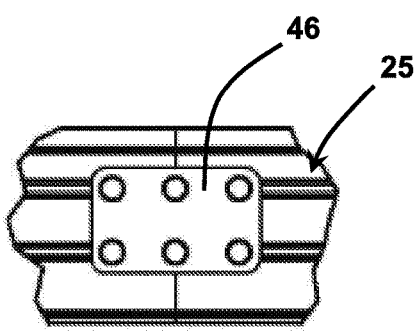
FIG. 10 is a side view showing a modular connection between different segments of the chain rail.

Each chain rail in the system is designed to be built in segments 43, 45 that are butted together and joined by a fastener bracket 46 (see FIG. 10). In this way, the overall length of the chain rail system may be adjusted to adapt to different container lengths.

Figure 3:
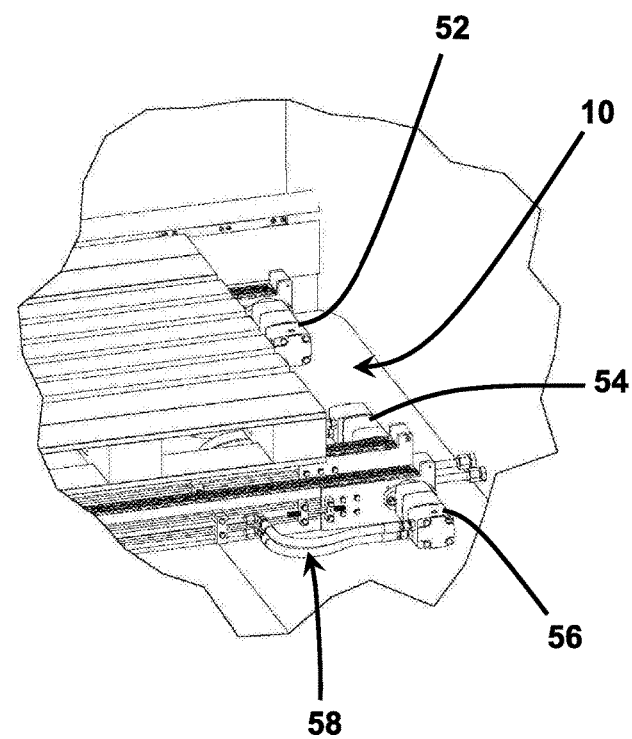
FIG. 3 is a pictorial view of the forward end (relative to the trailer) of the chain rail loading system.
Figure 4:
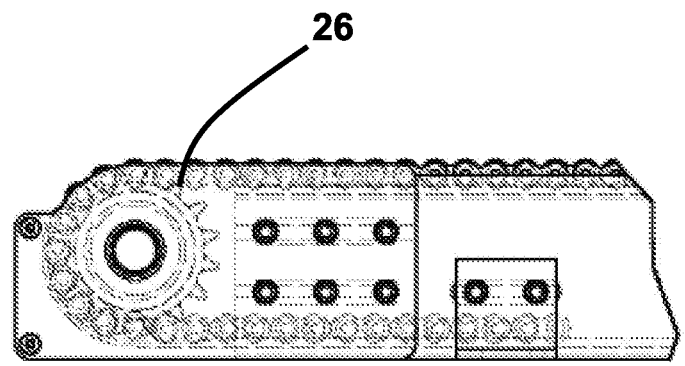
FIG. 4 is a side view of the aft end of one chain rail.
Figure 5:
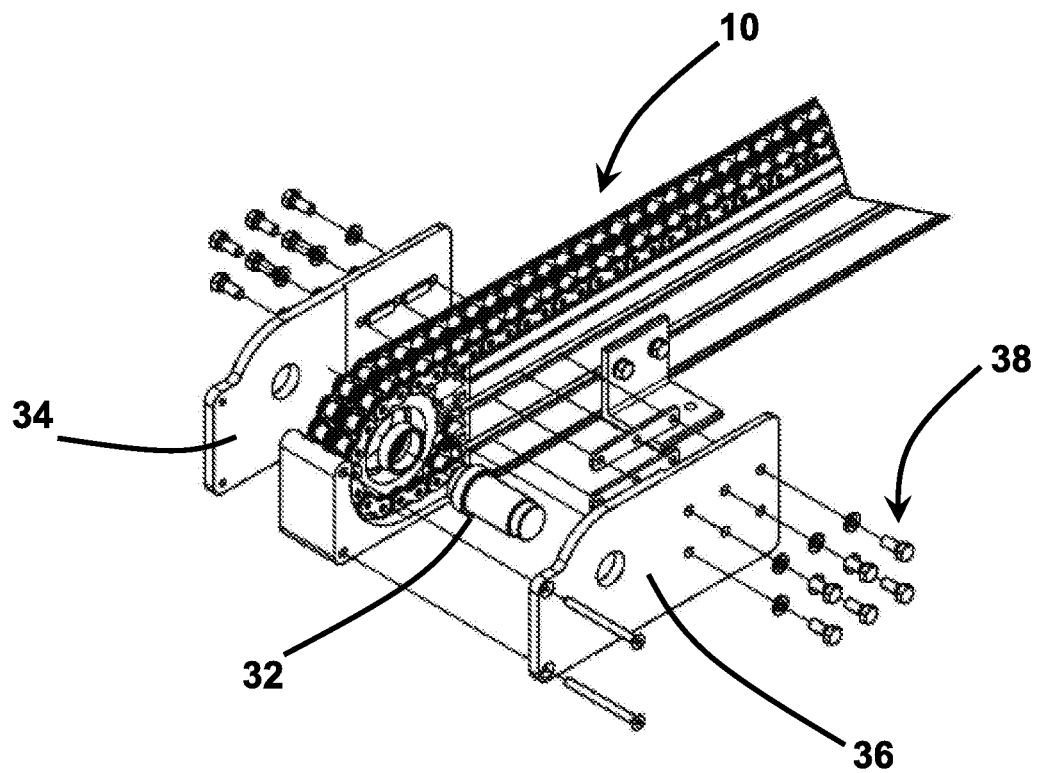
FIG. 5 is an exploded view of the chain rail illustrated in FIG. 4.
Figure 6:
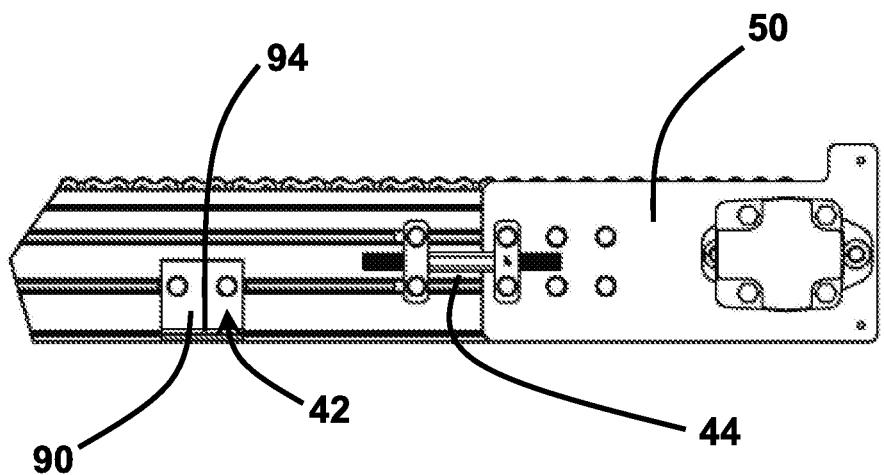
FIG. 6 is a side view of the forward end of one chain rail.

As described above, each chain rail 12, 14, 16, 18 has its own drive motor (see, e.g., items 52, 54, 56 in FIG. 3). These motors are driven by hydraulic hoses 58 and may be reversed, as needed, for the purpose of driving the chain rail systems in a clockwise or counterclockwise direction. Obviously, during a loading operation, the motors 52, 54, 56 are driven simultaneously so that the respective chains on the system move clockwise until the loading procedure is completed. Unloading involves reversing the direction of the motors.

The hydraulic motors 52, 54, 56 sit within the height of the chain rails 12, 14, 16, 18 so as to not interfere with pallet loading/unloading. Typical pallets are indicated at 57 in FIGS. 1, 2 and 3. Each chain rides on an extruded alley or guide way 60 (see FIG. 8), on top of the chain rail, thus eliminating idler pulleys for the chain. The chain 22 is retained in between sidewalls 62, 64 of the alley way 60. Replaceable plastic wear strips 66, 68 are placed on the rail 25, as indicated, to guide the chain 22.

Figure 8:
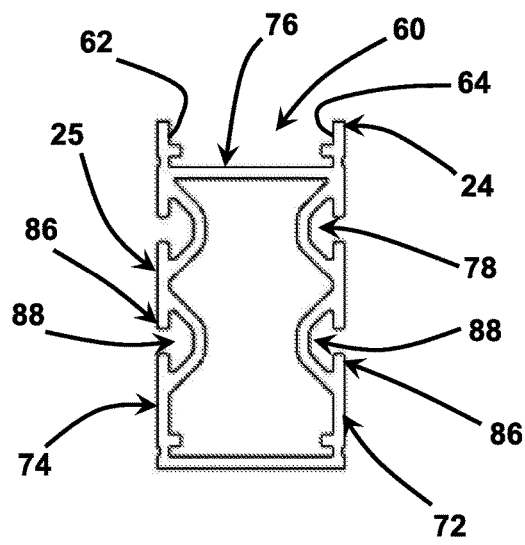
FIG. 8 is a cross sectional view of a chain rail.
Figure 11:
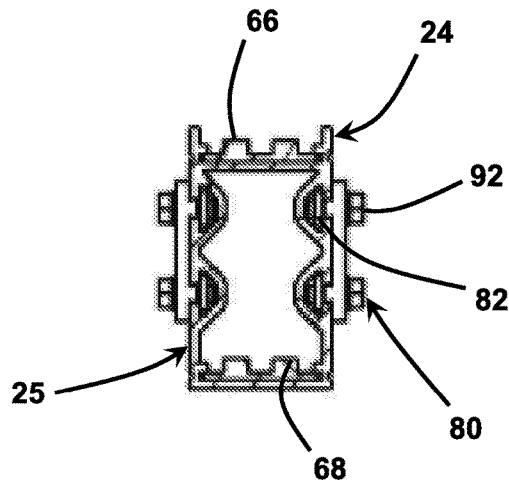
FIG. 11 is a cross sectional view of FIG. 10.

Referring now to FIG. 8, the extruded configuration of the rail 25 will be described. As is apparent from FIGS. 8, 9 and 11, the rail 25 is a hollow extrusion. The extrusion includes a base portion 70, opposite lateral side portions 72, 74, and a top portion 76 that spans the distance between side portions 72, 74. The top portion 76 is shaped into a chain guideway by the sidewalls 62, 64 and alleyway 60 previously described.

As part of the extrusion, each lateral side portion 72, 74 includes at least one lengthwise channel, indicated generally at 76 in FIG. 8. The embodiment illustrated in the figures also shows another lengthwise channel 78 that is vertically above the one (76) just described. These channels 76, 78 serve to capture a mounting bracket 42 and other fasteners 80 (see FIGS. 9 and 11).

Generally speaking, a typical fastener will have a fastener head 82 and a shaft 84. Each lengthwise channel 76, 78 in the rail 25 has a lengthwise slot 86 that leads into a lengthwise retaining space 88 (see FIG. 8). The retaining space 88 is sized to receive the fastener head 82 with sufficient space to allow the fastener head to move lengthwise along the rail 25 while remaining inside the retaining space. As is apparent from the drawings, the slot 86 is wide enough to allow the fastener shaft 84 to slide within and along the slot, but the slot 86 is sufficiently narrow so as to prevent the fastener head 82 from exiting laterally outwardly through the slot. This arrangement captures the fastener head 84 within the retaining space 88 while allowing the fastener to be moved adjustably along the rail to a desired location.

The arrangement described above allows a series of brackets 42 described above to serve as individual mounting members for connecting the rail 25 to the underlying floor surface 91 (see FIGS. 1 and 2). Each bracket 42 has a vertical portion 90 that covers, or at least partially covers, the slot 86 described above. The vertical portion 90 has a bore or opening 91 for allowing the shaft 84 of the fastener to pass through the mounting bracket 42 and be captured by a fastener nut 92. The bracket 42 also has a horizontal portion 94 for mounting the rail 25 to the floor. The configuration just described enables a plurality of mounting brackets 42 to be used to removably mount the rail 25 to a pre-existing floor surface 91.

The scope of the patent right is not intended to be limited to the foregoing description. Instead, the patent right is limited to the patent claim or patent claims that follow, the interpretation of which is to be made in accordance with the standard doctrines of patent claim interpretation.

What is claimed is:

1. A rail mounting system for an endless chain load conveyor system that is mountable to a pre-existing floor surface, comprising:

an elongated rail that is independently mountable to an underlying floor surface, and with said rail comprising a hollow extrusion that includes a base portion for resting said extrusion on said floor surface, and lateral side portions that project upwardly from said base portion, and a top portion that is shaped as an endless chain guideway to at least partially receive a conveyor chain, each one of said lateral side portions including an extruded portion that includes a lengthwise channel for capturing a portion of a fastener, said fastener having at least a fastener head and a fastener shaft, said lengthwise channel comprising a lengthwise slot that leads into a lengthwise retaining space, said retaining space being sized to receive said fastener head with sufficient space to allow said fastener head to move lengthwise along said rail while inside said retaining space, and further, said slot being wide enough to allow said fastener shaft to slide within and along said slot, but said slot being sufficiently narrow so to prevent said fastener head from exiting laterally outwardly through said slot from said retaining space, thereby capturing said fastener head within said retaining space while allowing said fastener to be moved adjustably along said rail to a desired location, and at least one mounting member having a vertical portion arranged to contact and cover a region of said slot, said vertical portion of said mounting member having an opening for allowing said fastener shaft to pass through said vertical portion for connecting said fastener to said mounting member, and said mounting member further having a horizontal portion for connecting said mounting member to said underlying floor surface, and whereby said lengthwise channel, said at least one mounting member, and said fastener cooperatively enable said rail to be removably connected to said floor surface at an installer selected connection point when said rail is mounted to said floor surface.

2. The rail mounting system of claim 1, including a chain wear strip received within said chain guideway for guiding said conveyor chain.

3. The rail mounting system of claim 1, including a chain wear strip received within said hollow extrusion and resting on said base portion for guiding said conveyor chain within said hollow extrusion.

4. The rail mounting system of claim 1, wherein said extruded portion of each one of said lateral portions is vertically below another extruded portion of each one of said lateral portions, with said other extruded portion having a second lengthwise channel for capturing a portion of another fastener.

5. The rail mounting system of claim 1, wherein said extruded portion of each one of said lateral portions is vertically above another extruded portion of each one of said lateral portions, with said other extruded portion having a second lengthwise channel for capturing a portion of another fastener.

6. The rail mounting system of claim 1, wherein said elongated rail comprises a plurality of extruded rail segments that are butted together to form said elongated rail.

* * * * *